US008400987B2

(12) United States Patent
Holland et al.

(10) Patent No.: US 8,400,987 B2
(45) Date of Patent: Mar. 19, 2013

(54) SYSTEMS AND METHODS FOR MULTI-CHANNEL MEDIUM ACCESS CONTROL

(75) Inventors: Gavin D. Holland, Oak Park, CA (US); Fan Bai, Ann Arbor, MI (US); Hariharan Krishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 450 days.

(21) Appl. No.: 12/762,431

(22) Filed: Apr. 19, 2010

(65) Prior Publication Data

US 2011/0255482 A1   Oct. 20, 2011

(51) Int. Cl.
*H04J 3/14* (2006.01)
(52) U.S. Cl. .......................... 370/336; 370/345
(58) Field of Classification Search .................. 370/328, 370/336, 338, 345, 347, 442, 445, 447, 448, 370/461, 463, 329; 709/223, 225
See application file for complete search history.

(56) References Cited

U.S. PATENT DOCUMENTS

| | | | |
|---|---|---|---|
| 6,665,701 B1* | 12/2003 | Combs et al. | 709/223 |
| 2005/0100045 A1* | 5/2005 | Hunkeler et al. | 370/338 |
| 2008/0232309 A1* | 9/2008 | McNew et al. | 370/336 |
| 2010/0157961 A1* | 6/2010 | Ji et al. | 370/338 |
| 2011/0090847 A1* | 4/2011 | Hu | 370/328 |
| 2011/0141970 A1* | 6/2011 | Juan et al. | 370/328 |

OTHER PUBLICATIONS

Seung-eun Chung; JoonYoo; Chong-kwon Kim; , "A cognitive MAC for VANET based on the WAVE systems," Advanced Communication Technology, 2009. ICACT 2009. 11th International Conference on , vol. 01, No., pp. 41-46, Feb. 15-18, 2009.*

* cited by examiner

*Primary Examiner* — Jeffrey M Rutkowski
(74) *Attorney, Agent, or Firm* — Parks IP Law LLC; Stephen Terrell

(57) ABSTRACT

Systems and methods for controlling communication on a control channel and service channels of an ad hoc wireless network includes periodically switching to the control channel during a control interval, periodically switching to one of the service channels during a service interval, and variably switching to another of the service channels during the service interval.

17 Claims, 3 Drawing Sheets

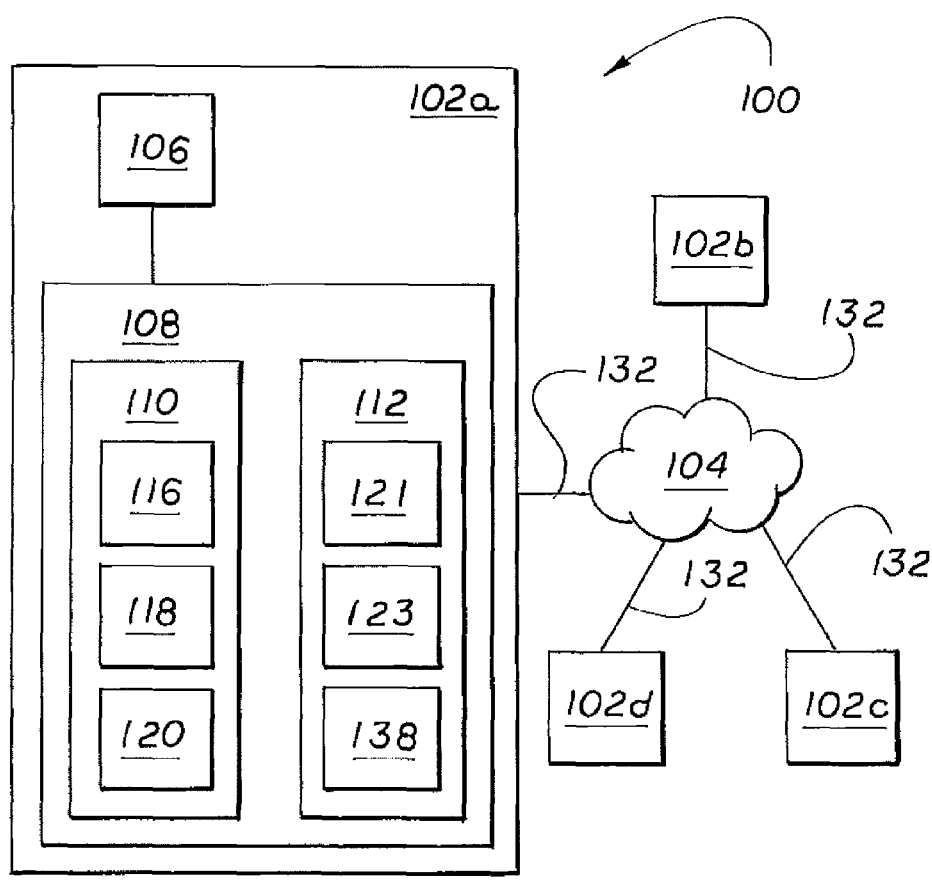
Fig_1
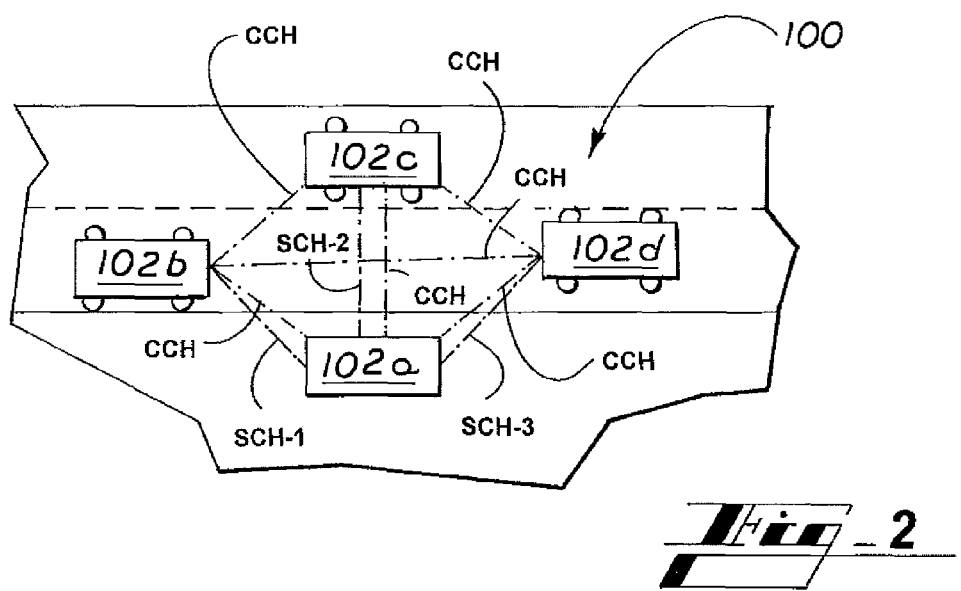
Fig_2

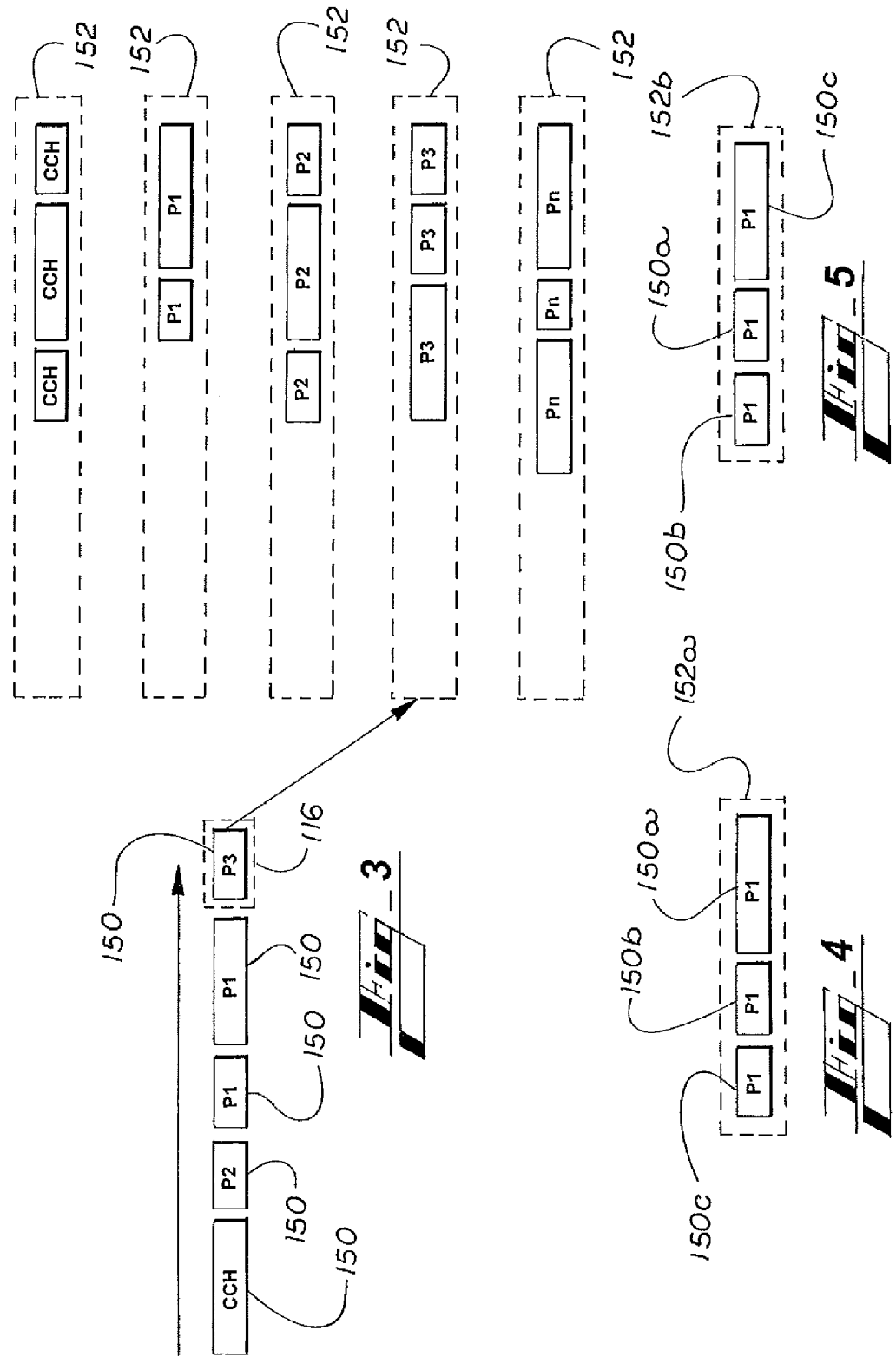

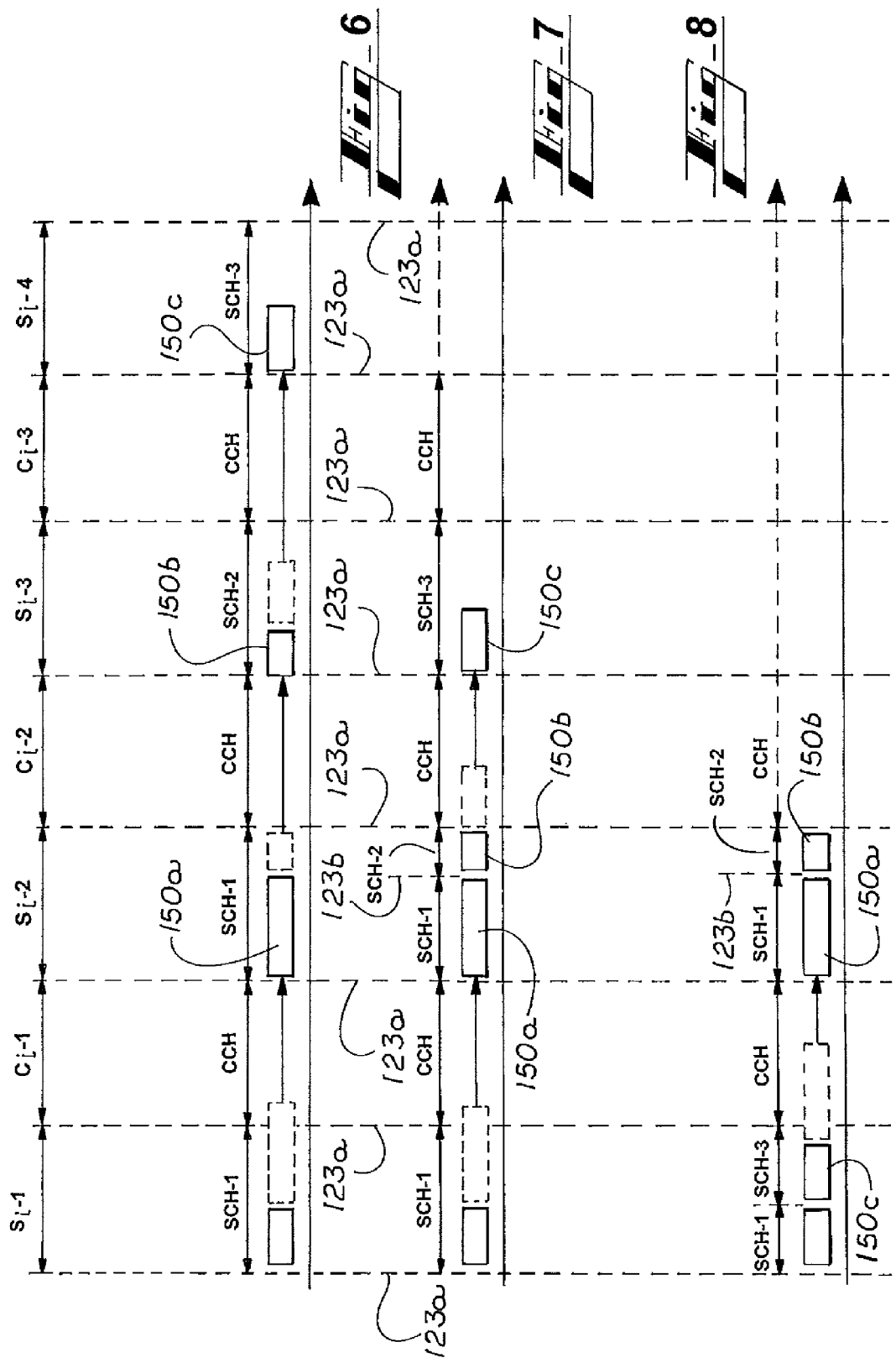

US 8,400,987 B2

SYSTEMS AND METHODS FOR MULTI-CHANNEL MEDIUM ACCESS CONTROL

TECHNICAL FIELD

The technical field is generally wireless ad hoc networks, and, more specifically systems and methods for communicating on wireless ad hoc networks using multi-channel medium access control mechanisms.

BACKGROUND

Using traditional multi-channel medium access control (MC-MAC) protocols such as IEEE 1609.4, servers are tied to one of multiple service channels during a service interval and clients with similar service demands within the same spatial region tend to flock to the same scheduling channels. This results in a spatio-temporal load on a server that is imbalanced across the channel spectrum. Also, tying the servers to a single scheduling channel during a service interval introduces transaction delays, idle periods, and scheduling latency.

SUMMARY

The systems and methods described herein efficiently utilize the network by more optimally scheduling and executing transactions on service channels during a service interval. The systems and methods include queuing and intra-service interval channel switching.

According to an exemplary embodiment, a method for controlling communication on a control channel and service channels of an ad hoc wireless network includes periodically switching to the control channel during a control interval, periodically switching to one of the service channels during a service interval, and variably switching to another of the service channels during the service interval. The service interval is between consecutive control intervals.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic illustration of a wireless ad hoc network, according to an exemplary embodiment.

FIG. 2 is a schematic illustration of vehicles and a road side unit utilizing the wireless ad hoc network of FIG. 1.

FIG. 3 is a schematic illustration of a MC-MAC module placing transactions in priority queues.

FIG. 4 is a schematic illustration of a priority queue of FIG. 3 that is ordered according to arrival time.

FIG. 5 is a schematic illustration of a priority queue of FIG. 3 that is ordered according to execution time that best fits residual time of a service interval.

FIG. 6 is a graphical illustration of communication between the road side unit and the vehicles of FIG. 2 according to IEEE 1609.4 protocol.

FIGS. 7 and 8 are graphical illustrations of communication between the road side unit and the vehicles of FIG. 2 over the wireless ad hoc network of FIG. 1, according to exemplary methods.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are know to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary systems and methods for multi-channel medium access control (MC-MAC) of wireless ad hoc networks and other dedicated short range communication (DSRC) networks are described. MC-MAC supports different classes (e.g., safety, non-safety) of transactions and provides a framework to maintain node-to-node connectivity and optimize data throughput and performance in a wireless ad hoc network. For purposes of teaching, exemplary embodiments are taught herein as being compatible with, built upon, or a variation of the current IEEE 802.11 and IEEE 1609.4 standards for MC-MAC. However, it should be understood that the systems and methods described herein can be built upon, compatible with, or variations or other standards and the like.

The physical layer of wireless communications in the ad hoc network has a number of non-overlapping channels which are orthogonal to each other. One of the channels is the control channel (CCH) and the remaining channels are service channels (SCH1, SCH2, . . . , SCHn).

The multi-channel medium access control (MC-MAC) protocol schedules access to the channels dynamically (for example, at least twice every second) among the neighboring devices. The current protocol, as defined by the IEEE P1609.4 working group, is a fully distributed "split-phase" approach whereby channel access is divided into two phases, a control phase and a service phase, which are interleaved in time. During the control phase, all devices tune to a single dedicated Control Channel (CCH) to exchange critical control and data information, such as synchronization or safety information. During the service phase the devices tune to any one of the Service Channels (SCH) to exchange any type of information.

The nodes collectively implement a channel switching algorithm for switching between the control channel CCH and the service channels SCH in a time synchronized manner. These channel switches are represented in the figures by switching points 123a and, in exemplary embodiments, are based on the IEEE 1609.4 protocol. All of the nodes operate on the control channel CCH for a control interval Ci to periodically broadcast safety, traffic, and channel information to other nodes and maintain network connectivity. During a service interval Si, each node in the ad hoc network operates on a service channel SCH and determines whether and when to switch to other service channels SCH to optimize data throughput in the ad hoc network. The lengths of control interval and service interval are either fixed or dynamically determined by the IEEE 1609.4 protocol. Switches between service channels during a service interval Si are represented by switching points 123b. These and other aspects of the systems and methods for MC-MAC for ad hoc networks are now described in greater detail.

FIG. 1 shows a system 100 that includes nodes, represented as communication devices 102, that are wirelessly coupled to one another over an ad hoc network 104. In general, each communication device 102 is or includes a radio configured to communicate on different frequency channels and a computing device configured to coordinate communication using the radio. Exemplary computing devices include a general-purpose computing device, a personal computer, a server, a portable computing device, a laptop computer, a small-form factor-computing device, a personal digital assistant (PDA), combinations thereof, and the like.

Referring to FIG. 1, for simplicity, communication device 102a is described in further detail and each of the other communication devices 102b, 102c, 102d is similarly configured. Communication device 102a includes a processor 106 coupled to system memory 108. System memory 108 includes volatile random access memory (RAM) and non-volatile read-only memory (ROM). The system memory 108 includes computer-program modules 110 that include computer-program instructions that are executable by the processor 106. The system memory 108 also includes program data 112 that is generated and/or used according to the computer-program instructions during execution of the computer-program modules 110. Illustrated computer-program modules 110 include a MC-MAC module 116, a Network Interface Control (NIC) driver 118, and auxiliary program modules 120 including an operating system to provide a runtime environment and a packet routing module to respectively route and receive information to and from MC-MAC module 116.

While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

MC-MAC module 116 includes instructions to divide the available communication channel frequencies into control channel CCH and service channels SCH. For example, six service channels SCH are used in DSRC. However, the MC-MAC module 116 can determine any number of service channels SCH. For purposes of teaching exemplary methods, three service channels SCH-1, SCH-2, SCH-3 are illustrated in FIG. 2 and described in further detail below.

The control channel CCH is a fixed channel frequency according to governing protocols such as the IEEE 1609.4 protocol. However, in alternative embodiments, the control channel can be dynamically adjusted using other customized government protocols. In alternative embodiments, criteria other than channel noise is used to select a control channel. According to an exemplary method, MC-MAC module 116 selects channel frequencies that are orthogonal to the control channel CCH as service channels SCH. The control channel CCH and the service channels SCH are collectively represented in FIG. 1 as channel set 121. As described above, each communication device 102 uses the control channel CCH to maintain network connectivity with all other communication devices 102. Pairs of communication devices 102 use service channels SCH according to a channel switching and scheduling algorithm implemented by MC-MAC modules 116 to increase network 104 data throughput, as described in further detail below.

Transactions 150 to be communicated over the channels CCH, SCH are generated by each communication device 102. As used herein, the term "transaction" refers to data packets, information, messages, applications, and the like. Each transaction 150 has an associated priority, arrival time, execution time, service channel, destination communication device. Referring to FIG. 3, the MC-MAC module 116 includes instructions to place the transactions 150 into priority queues 152 according to the priority of each transaction 150. The illustrated transactions 150 have priorities P1, P2, P3 ... Pn or are otherwise designated for communication on the control channel CCH.

Referring to FIGS. 4 and 5, the MC-MAC module 116 includes instructions for ordering transactions 150 in each of the priority queues 152. The MC-MAC module 116 orders the transactions 150 in each priority queue 152 according to arrival time or execution time, according to exemplary methods. Referring to FIG. 4, a priority queue 152a includes transactions 150a, 150b, 150c that are ordered according to arrival time with transaction 150a having the earliest arrival time and transaction 150c having the latest arrival time. Referring to FIG. 5, a priority queue 152b includes transactions 150a, 150b, 150c that are ordered according to execution time that best fits the residual time remaining in one or more schedule intervals Si. For example, the execution time that best fits the residual time is the execution time that minimizes the subsequent residual time. In FIGS. 4 and 5, the length of the transaction 150 represents the execution time.

MC-MAC module 116 includes instructions for servicing the priority queues 152 including scheduling and executing the next transaction 150 in the highest priority queue 152 during the service interval Si. To schedule and execute the transactions 150 on the associated channel CCH, SCH, the MC-MAC module 116 implements a channel switching algorithm including a periodic switching algorithm and a variable switching algorithm. The periodic switching algorithm periodically switches to the control channel CCH for a control time interval Ci and allows operation on service channels SCH during a service interval Si between control intervals Ci. Periodic channel switches are represented by switching points 123a in FIGS. 6-8. It should be noted that IEEE 1609.4 protocol ties each communication device to one service channel SCH during a service interval Si. In contrast, MC-MAC module 116 also institutes the variable, non-time synchronized switching algorithm for switching the communication device 102 between service channels SCH during a service interval Si. Variable channel switches during service intervals Si are represented by switching points 123b in FIGS. 7 and 8. The variable switching algorithm can be built upon existing periodic switching policies such as those of IEEE 802.11.

According to the variable switching algorithm, each communication device 102 is configured to determine if and when to switch to a different service channel SCH during a service interval Si. According to an exemplary scheduling method, the MC-MAC module 116 determines the execution time of the next transaction 150 in the highest priority queue 152 and the amount of residual time in the current service interval Si. If the amount of residual time in the service interval Si is greater than the execution time of the next transaction 150, the MC-MAC module 116 switches the communication device 102 to the appropriate service channel SCH and schedules and executes the transaction 150. If the amount of time left in the service interval Si is less than the execution time of the next transaction 150, the execution of the next transaction 150 is deferred and reassessed at the beginning of the next service interval Si.

For purposes of teaching, FIG. 2 illustrates a vehicle-to-vehicle/infrastructure (V2X) application of the system 100. Here, the communication devices 102 are integral to a roadside unit 102a and vehicles 102b, 102c, 102d. V2X communication includes vehicle-to-vehicle (V2V) communication and vehicle-to-infrastructure (V2I) communication. In the V2X application, safety transactions 150 are scheduled on the control channel CCH and general use or non-safety transactions 150 are scheduled on the service channels SCH. Non-safety transactions 150 include traffic status, weather, location-based service, and the like.

Exemplary methods are described for controlling the communication of the roadside unit 102a with the vehicles 102b, 102c, 102d including for servicing priority queues 152 of the roadside unit 102a. FIG. 2 illustrates the control channel CCH and three service channels SCH-1, SCH-2, SCH-3 of the ad hoc network 104 over which the roadside unit 102a respectively communicates with vehicles 102b, 102c, 102d. Service channel SCH-1 connects the roadside unit 102a and vehicle 102b, service channel SCH-2 connects the roadside unit 102a and vehicle 102c, and service channel SCH-3 connects the roadside unit 102a and vehicle 102d. For purposes of illustration, transaction 150a is associated service channel SCH-1, transaction 150b is associated service channel SCH-2, and transaction 150c is associated with service channel SCH-3.

For purposes of teaching, servicing the priority queue 152a of FIG. 4 according to the IEEE 1609.4 protocol is described. Referring to FIG. 6, the execution time of the transaction 150a is greater than the residual time in the first service interval Si-1 and the execution of transaction 150a is deferred to the second service interval Si-2. Deferred transactions 150 are represented by dashed lines. The channel switches to the control channel CCH for the first control interval Ci-1 and then to the first service channel SCH-1 for the second service interval Si-2. The execution of transaction 150a is scheduled on the first service channel SCH-1 during the second service interval Si-2. The IEEE 1609.4 protocol ties the communication device 102a to one channel during a service interval Si. As such, since the transaction 150b is to be scheduled on second service channel SCH-2, the transaction 150b is deferred until the third service interval Si-3. The channel switches to the control channel CCH for the second control interval Ci-2 and then to the second service channel SCH-2. The execution of transaction 150b is scheduled on the second service channel SCH-2 during the third service interval Si-3. Since the IEEE 1609.4 protocol ties the communication device 102a to one channel during a service interval Si, the transaction 150c is deferred until the fourth service interval Si-4. The channel switches to the control channel CCH for the third control interval Ci-3 and then to the third service channel SCH-3 for the fourth service interval Si-4. The execution of transaction 150c is scheduled on the third service channel SCH-3 during the fourth service interval Si-4 and the priority queue 152a is emptied.

Channel switching during the service interval Si by the MC-MAC module 116 reduces scheduling latency in general and the total time to schedule and execute the three transactions 150a, 150b, 150c in the exemplary embodiments. Scheduling latency is reduced by limiting idle periods and scheduling deferrals. Limiting scheduling latency more efficiently uses the bandwidth of the ad hoc network 104.

Referring to an exemplary method illustrated in FIGS. 2 and 7, The MC-MAC module 116 schedules transactions 150a, 150b, 150c that are ordered in priority queue 152a of FIG. 4 according to arrival time. Transaction 150a has the earliest arrival time and transaction 150c has the latest arrival time. The method begins in the middle of a first service interval Si-1. The MC-MAC module 116 determines the execution time of the transaction 150a and the amount of residual time in the first service interval Si-1. Since the amount of residual time in the first service interval Si-1 is less than the execution time of the transaction 150a, the scheduling and execution of the transaction 150a is deferred and reassessed at the second service interval Si-2. At switching points 123a, the MC-MAC module 116 switches the communication device 102a to the control channel CCH for the first control interval Ci-1 then to the first service channel SCH-1 for the second service interval Si-2. The MC-MAC module 116 schedules and executes the transaction 150a on the first service channel SCH-1 and determines the residual time in the second service interval Si-2 for scheduling additional transactions on different service channels SCH. Since the residual time in the second service interval Si-2 is greater than the execution time of the next transaction 150b, at switching point 123b, the MC-MAC module 116 switches to the second service channel SCH-2 and schedules and executes the transaction 150b. The MC-MAC module 116 then determines that the execution time of the transaction 150c is greater than the residual time remaining in the second service interval Si-2 and the transaction 150c is deferred to the third service interval Si-3. At switching points 123a, the MC-MAC module 116 switches the communication device 102a to the control channel CCH for the second control interval Ci-2 and then to the third service channel SCH-3 for the third service interval Si-3. The transaction 150c is scheduled and executed on the third service channel SCH-3 during the third service interval Si-3 and the priority queue 152a is emptied.

Referring to another exemplary method illustrated in FIGS. 2 and 8, the MC-MAC module 116 schedules transactions 150a, 150b, 150c that are ordered in priority queue 152b of FIG. 5 according to execution time and best fit to the residual time in the current service interval and/or upcoming service intervals. Transaction 150c has an execution time that best fits the remaining time in the first service interval Si-1 and is ordered to be first in the priority queue 152b. At switching point 123b, the MC-MAC module 116 switches to the third service channel SCH-3 and schedules and executes the transaction 150c. The residual time in the first service interval Si-1 is less than the execution time of either of the transactions 150a, 150b, which are deferred to the second service interval Si-2. At switching points 123a, the MC-MAC module 116 switches to the control channel CCH for the first control interval Ci-1 and then to the first service channel SCH-1 for the second service interval Si-2. The transaction 150a is scheduled and executed on the first service channel SCH-1 during the second service interval Si-2. Since the time remaining in the second service interval Si-2 is greater than the execution time of the transaction 150b, the MC-MAC module 116 switches to second service channel SCH-2 at switching point 123b. The transaction 150b is scheduled and executed on the second service channel SCH-2 and the priority queue 152 is emptied.

The above-described embodiments are merely illustrated implementations that are set forth for a clear understanding of principles. Variations, modifications, and combinations of the above-described embodiments may be made without departing from the scope of the claims. All such variations, modifications, and combinations are included herein by the scope of this disclosure and the following claims.

What is claimed is:

1. A communication device configured to communicate on a control channel and service channels of an ad hoc wireless network, the communication device comprising:
    a processor; and
    a multi-channel medium-access-control (MC-MAC) module comprising computer-executable instructions that, when executed by the processor, cause the processor to:
        periodically switch to the control channel during a control interval;
        periodically switch to one of the service channels during a service interval, the service interval being between consecutive control intervals; and
        variably switch to another of the service channels during the service interval as a function of a residual time in the service interval and an execution time of a next transaction in a queue.

2. The communication device of claim 1, the MC-MAC module further comprising computer-executable instructions that cause the processor to variably switch to another of the service channels during the service interval if the residual time in the service interval is greater than the execution time of the next transaction in a queue.

3. The communication device of claim 1, the MC-MAC module further comprising computer-executable instructions that cause the processor to place transactions in queues according to priority.

4. The communication device of claim 3, the MC-MAC module further comprising computer-executable instructions that cause the processor to order transactions in at least one of the queues as a function of arrival time.

5. The communication device of claim 3, the MC-MAC module further comprising computer-executable instructions that cause the processor to order transactions in at least one of the queues as a function of execution time.

6. The communication device of claim 5, the MC-MAC module further comprising computer-executable instructions that cause the processor to order transactions in at least one of the queues according to execution time that minimizes a residual time left in the service interval.

7. A non-transitory computer-readable medium, comprising:
    a multi-channel medium-access-control (MC-MAC) module for controlling communication on a control channel and service channels of an ad hoc wireless network, the MC-MAC module comprising computer-executable instructions that, when executed by a processor, cause the processor to:
        periodically switch to the control channel for a control interval;
        periodically switch to one of the service channels during a service interval, the service interval being between consecutive control intervals; and
        variably switch to another of the service channels during the service interval as a function of the residual time in the service interval and the execution time of a next transaction in a queue.

8. The non-transitory computer-readable medium of claim 7, the MC-MAC module further comprising computer-executable instructions that cause the processor to variably switch to another of the service channels if the residual time in the service interval is greater than the execution time of the next transaction in a queue.

9. The non-transitory computer-readable medium of claim 7, the MC-MAC module further comprising computer-executable instructions that cause the processor to place transactions in queues according to priority.

10. The non-transitory computer-readable medium of claim 9, the MC-MAC module further comprising computer-executable instructions that cause the processor to order transactions in at least one of the queues as a function of arrival time.

11. The non-transitory computer-readable medium of claim 9, the MC-MAC module further comprising computer-executable instructions that cause the processor to order transactions in at least one of the queues as a function of execution time.

12. The non-transitory computer-readable medium of claim 11, the MC-MAC module further comprising computer-executable instructions that cause the processor to order transactions in at least one of the queues according to execution time that minimizes a residual time left in the service interval.

13. A method for controlling communication on a control channel and service channels of an ad hoc wireless network, comprising:
    periodically switching, by a processor executing computer-executable instructions of a multi-channel medium-access-control (MC-MAC), to the control channel for a control interval;
    periodically switching, by the processor, to one of the service channels during a service interval, the service interval being between consecutive control intervals; and
    variably switching, by the processor, to another of the service channels during the service interval as a function of a residual time in the service interval and an execution time of a next transaction in a queue.

14. The method of claim 13, wherein variably switching to another of the service channels during the service interval includes switching to another of the service channels if the residual time in the service interval is greater than the execution time of the next transaction in a queue.

15. The method of claim 13, further comprising, according to computer-executable instructions of the MC-MAC module, placing transactions in queues according to priority.

16. The method of claim 15, further comprising, according to computer-executable instructions of the MC-MAC module, ordering transactions in at least one of the queues as a function of arrival time.

17. The method of claim 15, further comprising, according to computer-executable instructions of the MC-MAC module, ordering transactions in at least one of the queues according to execution time that minimizes a residual time left in the service interval.

* * * * *